United States Patent [19]
Ito et al.

[11] Patent Number: 5,513,007
[45] Date of Patent: Apr. 30, 1996

[54] IMAGE PROCESSING APPARATUS AND IMAGE PROCESSING METHOD

[75] Inventors: Akio Ito, Machida; Hiroyuki Ichikawa; Satoru Kutsuwade, both of Kawasaki, all of Japan

[73] Assignee: Canon Kabushiki Kaisha, Tokyo, Japan

[21] Appl. No.: 62,336

[22] Filed: May 17, 1993

[30] Foreign Application Priority Data

May 19, 1992 [JP] Japan .................................. 4-126161

[51] Int. Cl.$^6$ .................................................. H04N 1/387
[52] U.S. Cl. ........................... 358/296; 358/523; 358/538
[58] Field of Search ................................. 358/296, 518, 358/523, 524, 529, 530, 538, 298; 382/17, 162, 164, 166, 167; 355/214

[56] References Cited

U.S. PATENT DOCUMENTS

| | | | |
|---|---|---|---|
| 4,631,579 | 12/1986 | Hoffrichter et al. | 358/515 |
| 4,982,277 | 1/1991 | Katoh et al. | 358/80 |
| 5,138,443 | 8/1992 | Ikeda et al. | 358/80 |
| 5,206,718 | 4/1993 | Yamakawa | 358/517 |

*Primary Examiner*—Benjamin R. Fuller
*Assistant Examiner*—Craig A. Hallagher
*Attorney, Agent, or Firm*—Fitzpatrick, Cella, Harper & Scinto

[57] ABSTRACT

There is disclosed an image processing apparatus capable of identifying and converting a predetermined color in the input image into a predetermined density, whereby the color in the original image can be identified in a monochromatic image by the density. The apparatus is provided with a discrimination unit for identifying a predetermined color in the input image, a first image processing unit for applying a first image processing to the input image according to the result of discrimination by the discrimination unit, a second image processing unit for applying a second image processing to the input image, and a control unit for invalidating the second image processing in an area in which the image processing is conducted by the first image processing unit.

18 Claims, 8 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method, for transforming an input image into a predetermined image.

2. Related Background Art

There is recently proposed a digital copying machine which is capable of converting the color information of an original into a color signal by a photoelectric converting device such as a color CCD, and replacing an area identified as of a predetermined color by the color signal with a predetermined monochromatic density signal, thereby providing a monochromatic image.

Thus, there can be printed, with a monochromatic printer, a monochromatic image allowing to identify a color area of the input color image.

On the other hand, in ordinary copying machines, the copying density is rendered regulable.

However, if the copying density is varied in the above-mentioned digital copying machine capable of replacing the predetermined color with a predetermined monochromatic density, the replacing predetermined density also varies, so that there are encountered drawbacks that the color of the original image cannot be estimated from the printed monochromatic image and that a clear printed image cannot be obtained.

SUMMARY OF THE INVENTION

An object of the present invention is to provide an image processing apparatus and an image processing method not associated with the above-mentioned drawbacks.

Another object of the present invention is to provide an image processing apparatus and an image processing method capable of applying, to an image, first and second processings without mutual interference.

Still another object of the present invention is to provide an image processing apparatus and an image processing method, capable of providing an image which is easy to observe and judge for the user.

Still another object of the present invention is to provide an image processing apparatus capable of converting an area of a predetermined color in the input color image into a monochromatic image of a predetermined density, regardless of the selected copying density.

The foregoing objects can be attained, according to the present invention, by discriminating a predetermined color in the input image, applying a first image processing to the input image according to the result of said discrimination, also applying a second image processing to the input image, and invalidating the second processing in an area subjected to the first image processing.

Still other objects of the present invention, and the features thereof, will become fully apparent from the following description, which is to be taken in conjunction with the attached drawings.

DESCRIPTION OF THE PREFERRED EMBODIMENTS

Now the present invention will be clarified in detail by a preferred embodiment thereof shown in the attached drawings.

[Structure of copying machine]

Figure 1:
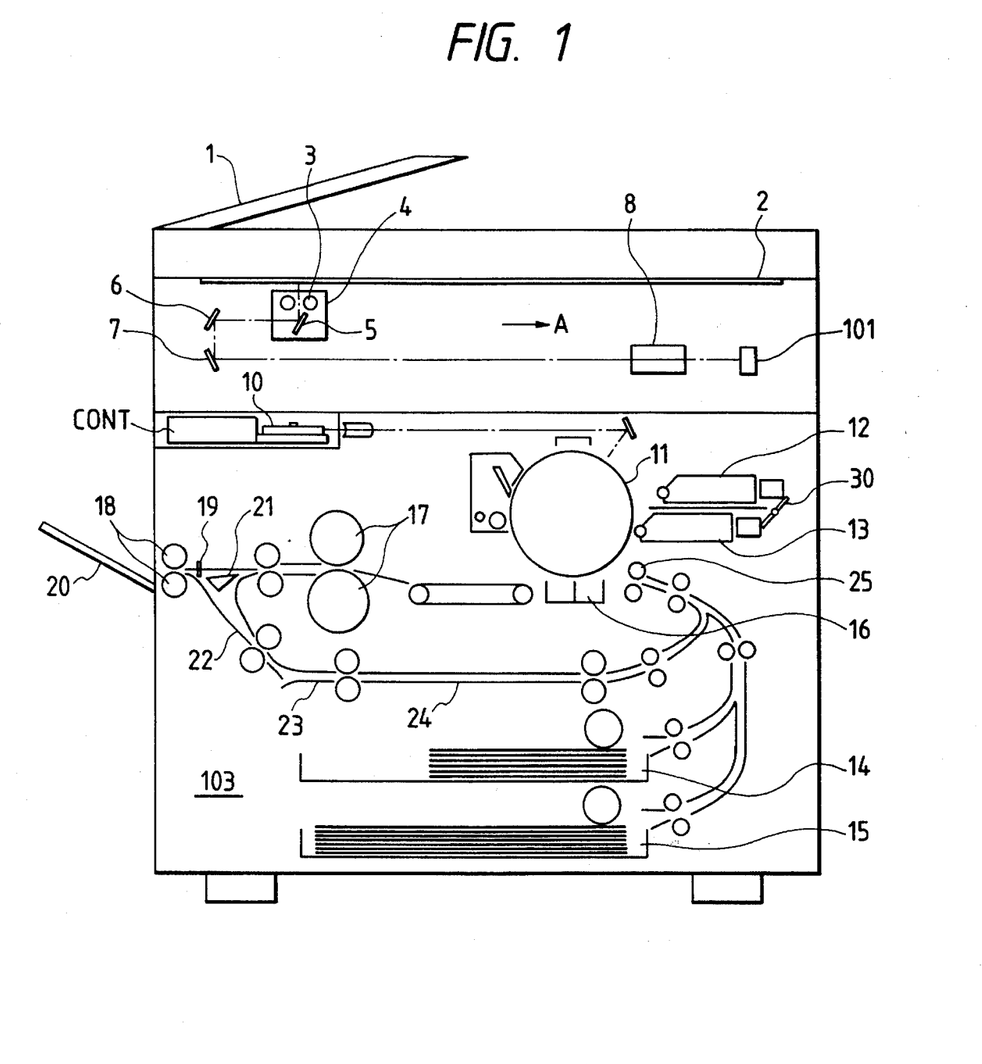
FIG. 1 is a cross-sectional view of a copying machine embodying the present invention.

FIG. 1 is a cross-sectional view showing the configuration of a copying machine embodying the present invention.

Referring to FIG. 1, an automatic original feeding unit 1 feeds the stacked originals one by one or two originals in a continuous manner, to a predetermined position on an original supporting glass 2. A scanner 4 composed of an exposure lamp 3 for illuminating the original, a scanning mirror 5 for scanning the original, etc. is moved in a direction A after an original is placed on the original supporting glass 2 by the original feeding unit 1, whereby the light reflected from the original is focused on a CCD image sensor unit 101 by way of the scanning mirrors 5–7 and a lens 8. An exposure control unit 10 composed of a laser scanner irradiates a photosensitive member 11 with a light beam, modulated according to image data released from an image signal control unit of a control unit CONT. A read developing unit 12 and a black developing unit 13 render visible an electrostatic latent image formed on the photosensitive member 11, by means of predetermined developers (toner). One of the developing units 12, 13 is positioned close to the photosensitive drum 11 by a developing unit switcher 30, while the other is retracted from the photosensitive drum 11. In case of multiple developments, the developing unit switcher 30 is controlled by the controller unit CONT. Sheet stackers 14, 15 support stacked sheets of predetermined sizes. The sheet is fed from the stacker 14 or 15 by a feed roller to the position of registration rollers 25, and is further transported by the registration rollers 2 with such a timing that the front end of the image formed on the photosensitive drum 11 coincides with the front end of the sheet.

A transfer-separation charger 16 transfers a toner image, developed on the photosensitive drum 11, onto the sheet and separates the sheet from the drum 11. Then, the sheet is transported by a conveyor belt, and the toner is fixed to the sheet in a fixing unit 17. Discharge rollers 18 discharge the recorded sheet onto a tray 20. A direction flapper 21 either discharges the recorded sheet toward the tray 20 or transports it toward internal transport paths 22, 23, 24.

At the two-side recording, the flapper 21 is positioned lower for sheet discharge toward the tray 20, and, after the sheet passes a sheet discharge sensor 19, the discharge rollers 18 are rotated in the reverse direction and the flapper 21 is simultaneously lifted whereby the recorded sheet is stored in an intermediate tray 24 through the transport paths 22, 23. At the next recording on the bottom side, the sheet stored in the intermediate tray 24 is fed for image transfer onto the bottom side.

At the multiple recording, the flapper 21 is lifted to store the recorded sheet in the intermediate tray 24 through the paths 22, 23. At the second recording to be conducted next, the sheet stored in said intermediate tray 24 is fed for multiple image transfer.

[Operation unit]

Figure 2:
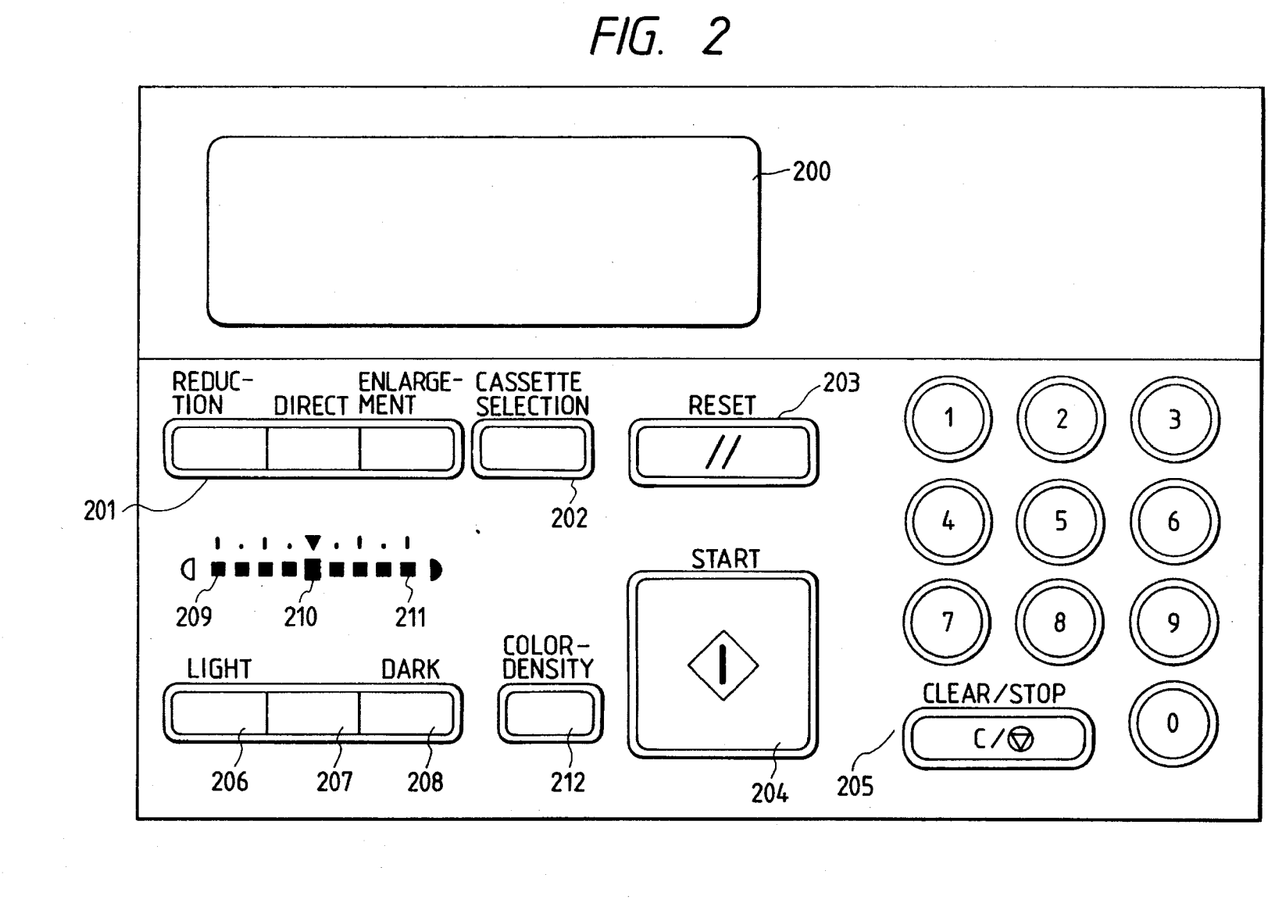
FIG. 2 is a view showing a part of an operation panel of the copying machine.

FIG. 2 shows a part of the operation unit of the copying machine of the present embodiment.

A display unit 200 displays the status of the apparatus, the number of copies, the copying magnification and the copying sheet size, and also displays the content of setting of the copying mode at the setting thereof.

Reduction and enlargement keys 201 are used for reducing or enlarging the image of a predetermined size into the image of another predetermined size.

A cassette selection key 202 is used for selecting the cassettes containing sheet.

A reset key 203 is used for restoring a standard mode.

There are also provided a copy start key 204, and numeral keys 205 for entering numbers.

Copy density keys 206, 207, 208 are used respectively for obtaining a lower copy density, a standard copy density and a higher copy density. An LED 211 is turned on at the highest copy density, while an LED 210 is turned on at the standard density, and an LED 209 is turned on at the lowest copy density. A key 212 is used for setting a color-density conversion mode for converting a color component of the original into a density corresponding to the color, and this key 212 is depressed when the conversion mode is selected.

Figure 3:
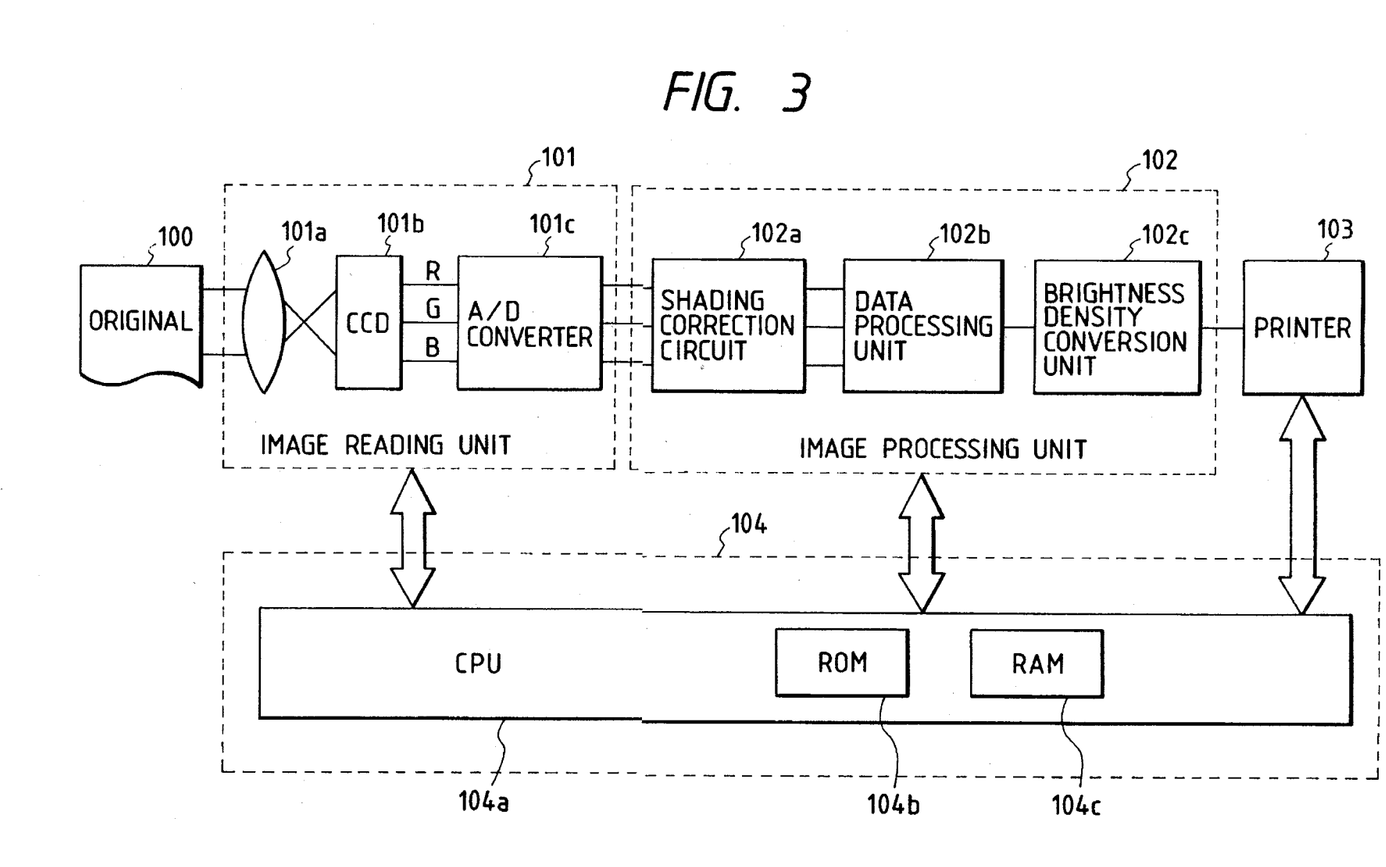
FIG. 3 is a block diagram of an image processing system of the copying machine.

FIG. 3 is a block diagram of the copying machine of the present embodiment.

A full-color original is illuminated by the exposure lamp 3, then the reflected color image is picked up by the CCD image sensor 101, and the obtained image signal is processed and supplied to a printer 103.

The color image information of the original 100 is focused, through a lens 101a of an image reading unit 101, onto the CCD image sensor 101b, which reads each line with a resolution of 400 dpi for R (red), G (green) and B (blue). The read information is released by analog signals and supplied to an A/D converter 101c for converting said analog signals into digital signals, which are supplied to an image processing unit 102. The image processing unit 102 effects shading correction by a shading correction circuit 102a, thereby generating image data of 8 bits for each of R, G and B. A data processing unit 102b identifies the color of the read image data and converts the color into a corresponding density signal, and a brightness-density converting unit 102c converts the brightness data into density data, thus generating print data for the printer 103. The printer 103 is provided with a control circuit for a sheet advancing motor, etc., a laser recording unit for writing the input image data onto the photosensitive drum, and a development control circuit. A CPU unit 104 provided with a CPU 140a, a ROM 104b and a RAM 104c controls the image reading unit 101, the image processing unit 102 and the printer 103 and effects the entire sequence control of the copying machine.

Figure 4:
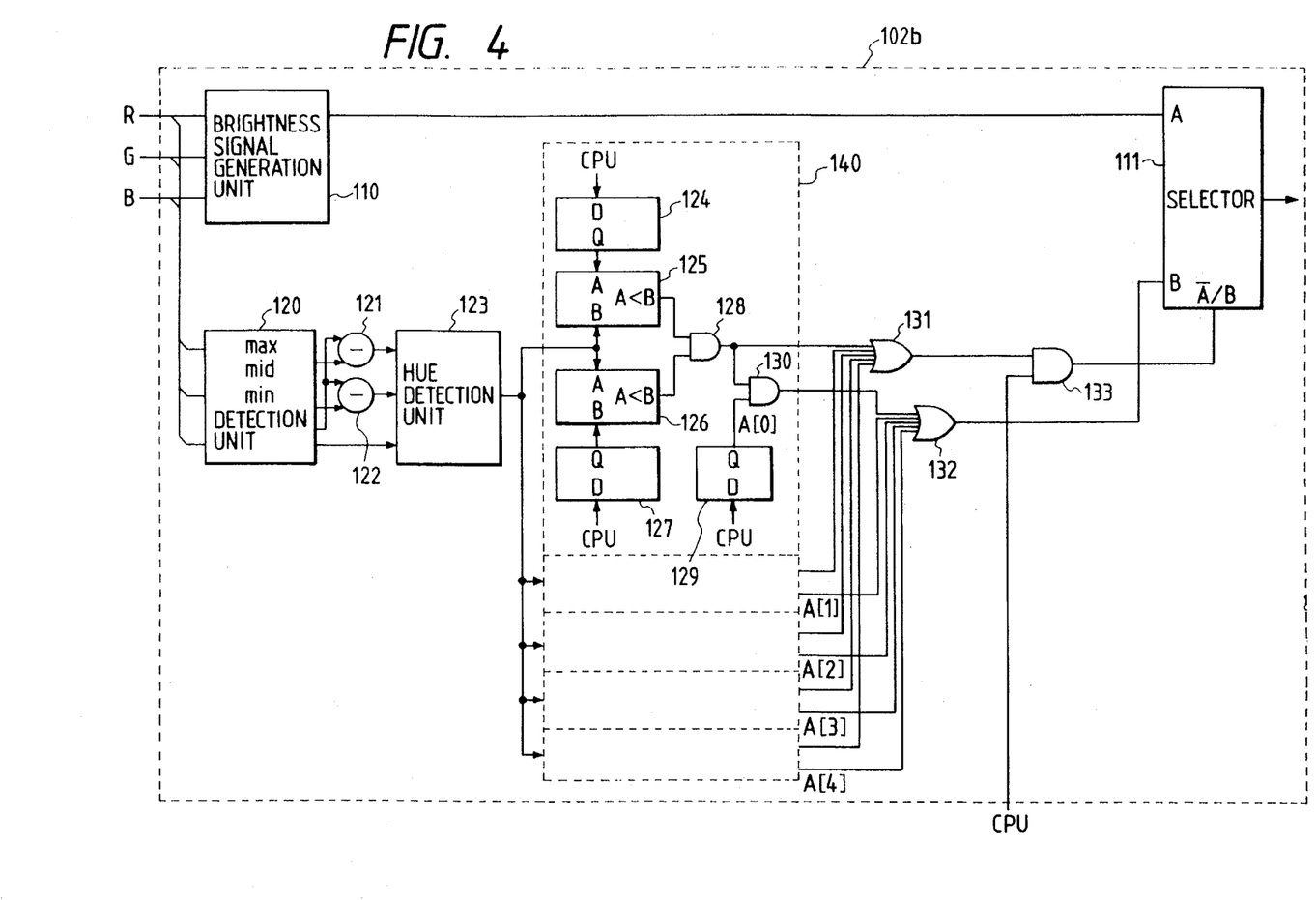
FIG. 4 is a detailed block diagram of a data processing unit 102b.

FIG. 4 is a detailed block diagram of the data processing unit 102b.

Based on the image data of R, G and B read by the CCD image sensor 101b, a brightness signal generation unit 110 generates the image data over the entire wavelength range of color synthesis, namely black-and-white image data, in order to obtain monochromatic print from the image of the color original. In the generation unit 110, the brightness signal is obtained by a calculation (R+G+B)/3, achieved by adders and multipliers, based on the input image data of R, G and B.

The image data of R, G and B are at the same time supplied also to a max/mid/min detection unit 120. Components 120–128 constitute a color discrimination unit, in which the components 120–128 are used for detecting the color component of the original image, in order to effect an image processing for obtaining a density corresponding to the color of a colored image area.

The color discrimination unit 120–128 utilizes a hue signal for color detection, in order to achieve exact discrimination of a same hue even if the luminocity or the saturation is different. (In strict sense, the hue mentioned above is different from the generally used hue, but the word "hue" will be used in the following description.)

At first, there will be outlines the color detecting method.

The input data are of 8 bits for each of R, G and B, so that the data have information of $2^{24}$ colors. The apparatus inevitably becomes expensive because of this magnitude of the information. In consideration of this fact, the present invention effects the following process, utilizing the hue mentioned above.

The input R, G, B data are at first supplied to a max/mid/min detection unit 120 for identifying the magnitude thereof. Through the comparisons with comparators, the detection unit 120 determines the order of magnitude of the R, G, B data, and also determined the maximum value, the middle value and the minimum value.

As already known by Munsell's color solid, the color space can be represented by saturation, luminocity and hue. It is therefore necessary to convert the input R, G, B data into two-dimensional data. For this purpose, there is utilized a fact that a common portion of the R, G, B data, namely min (R, G, B) corresponding to the minimum value of R, G and B, is a colorless component. Thus, the min (R, G, B) is subtracted from the R, G, B data, and the remaining information are utilized as the colored components. This method allows to achieve conversion to a two-dimensional input color space by a simple configuration.

Figure 5:
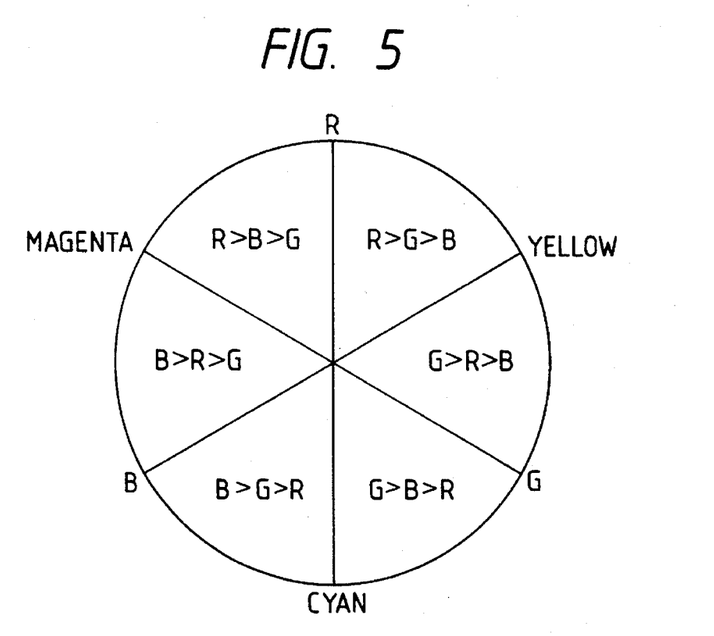
FIG. 5 is a view showing color hues.

Thus, converted two-dimensional plane can be represented by a circle of 0°–360° as shown in FIG. 5, on which the colors are divided in six regions and can be discriminated by the order of magnitude of the input R, G, B data, namely R>G>B, R>B>G, G>B>R, G>R>B, B>G>R or B>R>G.

For the above-explained conversion, subtractors 121, 122 subtract the minimum value or the colorless component from the maximum and middle values, and the results of the subtractions are supplied, together with an order signal indicating the order of magnitude of R, G and B, to a hue detection unit 123, which is composed of a ROM storing a look-up table.

The angle on the plane of FIG. 5 allows to calculate the (max - min) value, the (mid - min) value and the order of magnitude of R, G and B. The hue detection unit 123 stores, in advance, hues corresponding to the order signal, the (max - min) value and the (mid - min) value, and releases a corresponding hue in response to the entry of these data.

It is therefore rendered possible to convert the three-dimensional input color space into a two-dimensional color space and to determined a corresponding hue by a simple configuration of utilizing a look-up table, based on the order of magnitude of the input R, G, B data and the maximum and middle values of the input R, G, B data.

The hue released from the hue detection unit 123 is supplied to a window comparator 140, which discriminates whether the hue corresponds to a specified color. The present embodiment is designed to discriminate five colors, so that four other circuits, similar to that composed of the components 124–130, are provided in parallel in the window comparator 140.

Comparators 125, 126 are respectively connected to registers 124, 127, which are used for setting upper and lower limit values of the hue to be detected, by the CPU 104.

With a set reference value a1, the comparator 125 releases a signal "1" when the input hue data satisfies a relationship (input hue data)>(a1).

Similarly with a set reference value a2, the comparator 126 releases a signal "1" when the input hue data satisfies a condition (input hue data)<(a2).

Consequently, a succeeding AND gate 128 releases a signal "1" when a condition (a1)<(input hue data)<(a2) is satisfied.

In a register 129, a predetermined density value corresponding to the hue data is set in advance by the CPU 104, as will be explained later. An AND gate 130 releases the logic product of the output of the AND gate 129 and that of the register 128, and the release signal is supplied to a selector 111 through an OR gate 132.

The output of the AND gate 128 is also supplied to the selector 111 through an OR gate 131 and an AND gate 133. The CPU 104 sends a signal "1" or "0" respectively when the color-density conversion mode is selected or not by the key 212.

Other color detection circuits in the window comparator 140 have similar configurations, in which the comparators have set reference values corresponding to the respective colors for detection. The number of colors to be discriminated can be increased by adding similar circuits.

The selector 111 selects the output of the OR gate 132 when the output of the OR gate 131 is "1" and the signal from the CPU 104 to the AND gate 133 is "1", but otherwise selects the brightness signal from the brightness signal generation unit 110. Thus selected signal is converted in the brightness-density conversion unit 102c into density data for supply to the printer 103.

[Calculation of density value]

As explained before, the copy density can be varied, by the copy density keys 206, 207, 208, in nine levels from a lowest density to a highest density.

This copy density control is achieved by varying the look-up table, employed in the conversion from the brightness data into the density data, in the brightness-density conversion unit 102c.

The conversion unit 102c is provided with randomly accessible nine look-up tables F1–F9 for converting the brightness data into the density data, and one of the nine tables is selected by the copy density keys 206, 207, 208.

Figure 6:
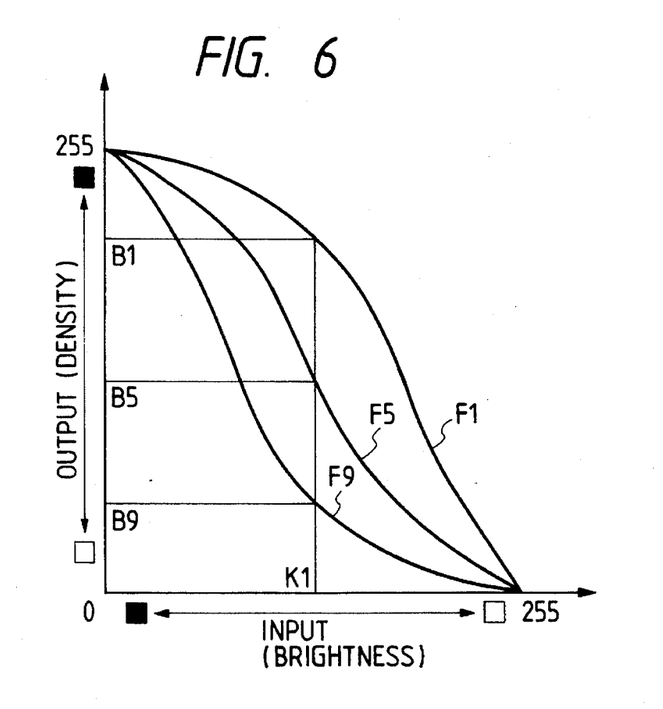
FIG. 6 is a chart showing the structure of a look-up table in a brightness-density conversion unit 102c.

FIG. 6 shows three tables for the highest, standard and lowest copy densities. The table F1, F5 or F9 is selected respectively when the highest, standard or lowest copy density is instructed from the operation unit.

Referring to FIG. 6, an input brightness data K1 is converted into a density data B1, B5 or B9 respectively when a look-up table F1, F5 or F9 is selected. The print density of the printer 103 becomes higher as the density data increases. Stated differently, even for a same input brightness data, the output density data varies depending on the look-up table employed. When the color-density conversion mode is selected by the setting key 212, the predetermined color in the input image is converted into the image of a predetermined density as explained before, but, if the look-up table is changed by the copy density keys 206, 207, 208, the density of the image subjected to such color-density conversion varies also.

Figure 7:
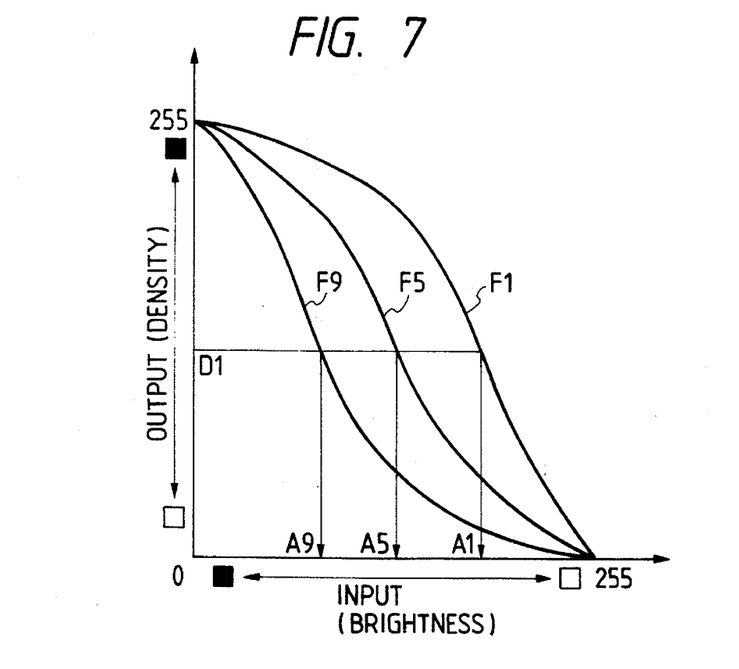
FIG. 7 is a chart showing the concept of determining the set register value from the look-up table of the brightness-density conversion unit 102c.

In order to obtain a constant density in the area of the predetermined color regardless of the lookup table employed, it is necessary to determine the input brightness data from the output density data and to set the input brightness data in the register 129. In order to obtain, for example, as shown in FIG. 7, an output density data D1, there is required an input brightness data A1, A5 or A9 respectively for the look-up table F1, F5 or F9.

In the present embodiment, nine look-up tables for converting the brightness data into the density data are stored in advance in the RAM 104c, and are selected and read by the CPU 104a, according to the density selected by the copy density keys 206, 207, 208 of the operation unit.

The input brightness data is calculated according to a program stored in advance in the ROM 104b, as will be explained in the following, with reference to a flow chart shown in FIG. 8.

Since the present embodiment can discriminate five colors, there are provided five fixed density values A[0]–A[4] respectively corresponding to the colors.

For an output density data X[I] ($0 \leq I \leq 4$), there is determined a corresponding input brightness data A[I] ($0 \leq I \leq 4$).

Assuming that the input brightness data J ($0 \leq J \leq 255$) provides the output density data B[J] ($0 \leq J \leq 255$), this can be achieved by comparing B[J] and X[I] and determining J when both become equal or when the difference becomes minimum. Thus, determined J corresponds to A[I].

Figure 8:
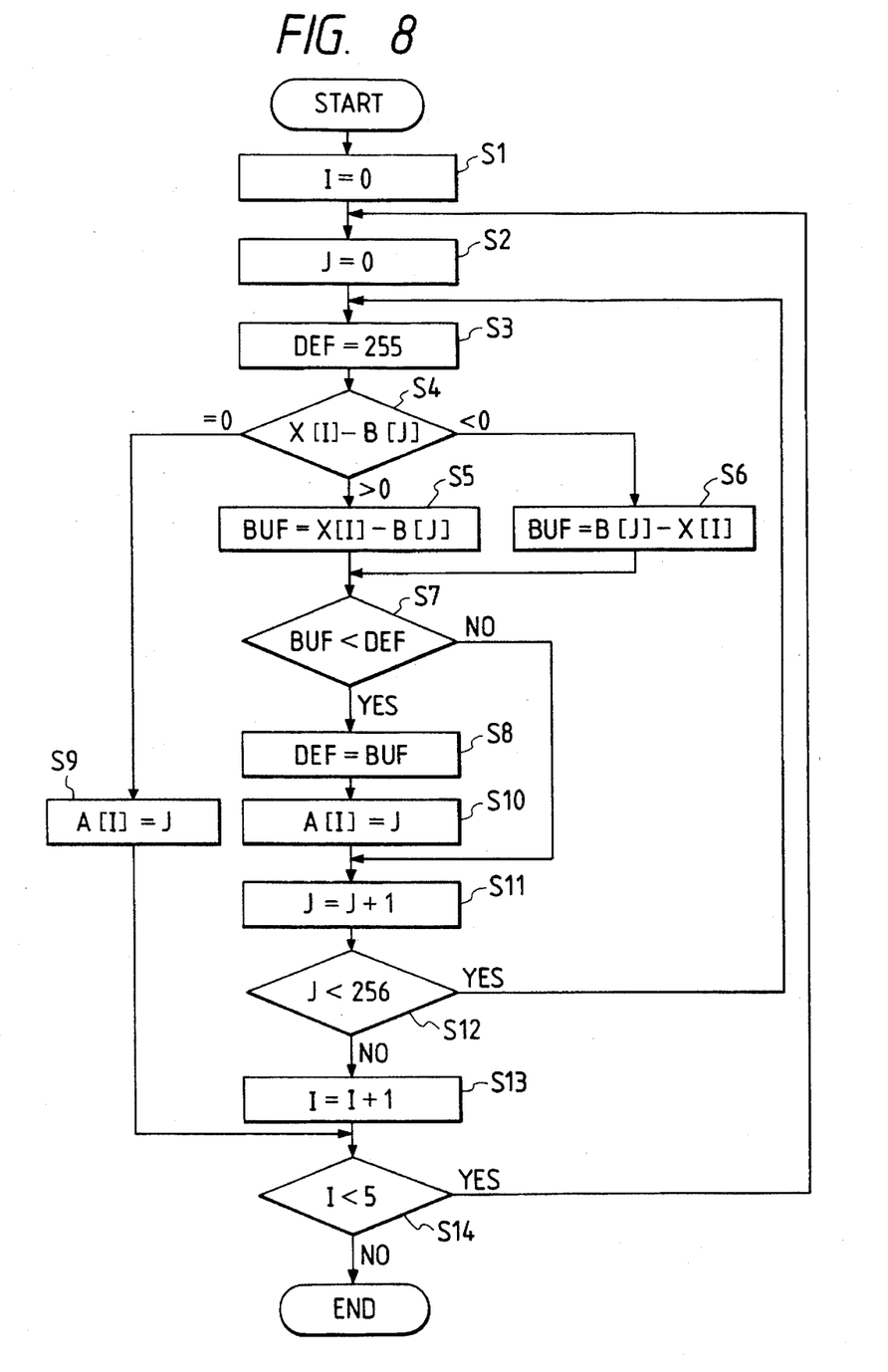
FIG. 8 is a flow chart for determining the set register value.

In the flow chart shown in FIG. 8, steps S1, S2 and S3 execute initialization. Then, X[I] is compared with B[J] (step S4), and, if both are equal, J is substituted in the desired A[I] (step S9). If both are not equal, the difference of X[I] and B[J] is determined and substituted in BUF (steps S5, S6). If the value of BUF is smaller than that of DEF (step S7), the value of DEF is replaced by that of BUF (step S8), A[I] is substituted (step S10). Then, the value of J is increased (step S11) and the sequence is repeated until J reaches 255 (step S12). The foregoing sequence is repeated until five values of A[I] are obtained (steps S13, S14).

The CPU 104a sets thus obtained A[0]–A[4] in the register 129 and other similar registers (not shown), respectively.

The flow shown in FIG. 8 is executed after the copy start key 204 is depressed, and the original reading operation is executed thereafter.

Consequently, when the window comparators 125, 126, etc. detect a predetermined color, there is released the density value A[I] preset in the register, and the density value A[I] is converted by the brightness-density conversion unit 102c into X[I] or a value closest thereto. It is therefore rendered possible to obtain a constant density always with the printer 103.

Figure 9:
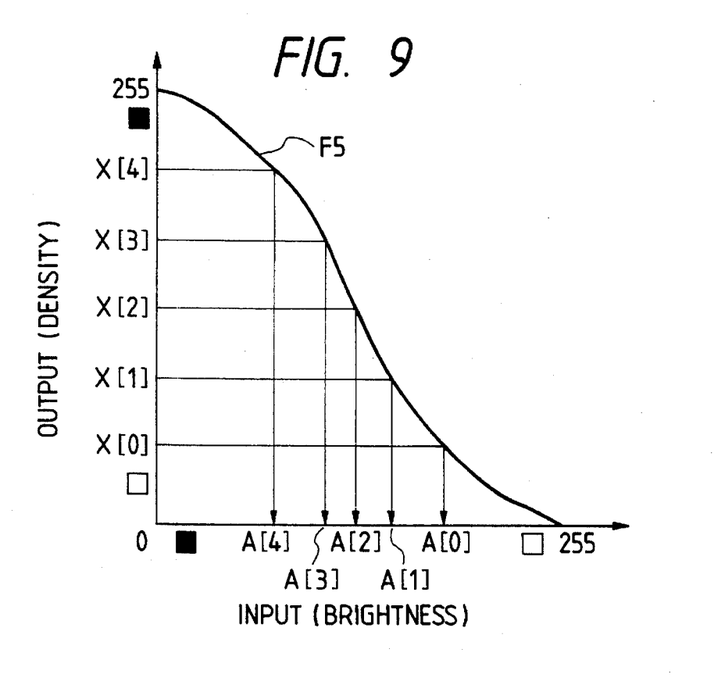
FIG. 9 is a chart showing the principle of determining the set register value.

FIG. 9 schematically shows the principle of calculating the input brightness data for different colors, based on the above-explained program, when the brightness density conversion unit 102c is so set as to effect the conversion with the look-up table F5. In FIG. 9, X[0]–X[4] indicate the output density values determined in advance for different colors. After the conversion by the brightness-density conversion unit 102c, the input brightness data A[9]–A[4] are so determined as to obtain the respective output density values. These input brightness data A[0]–A[4] are set by the CPU 104 in the five registers 129. Then, when the comparators 125, 126 identifies that the color of the input image is a predetermined color, the input brightness data set in the register 129 is supplied to the brightness-density conversion unit 102c, which supplies the printer 103 with the output density data corresponding to the input brightness data.

Figure 10:
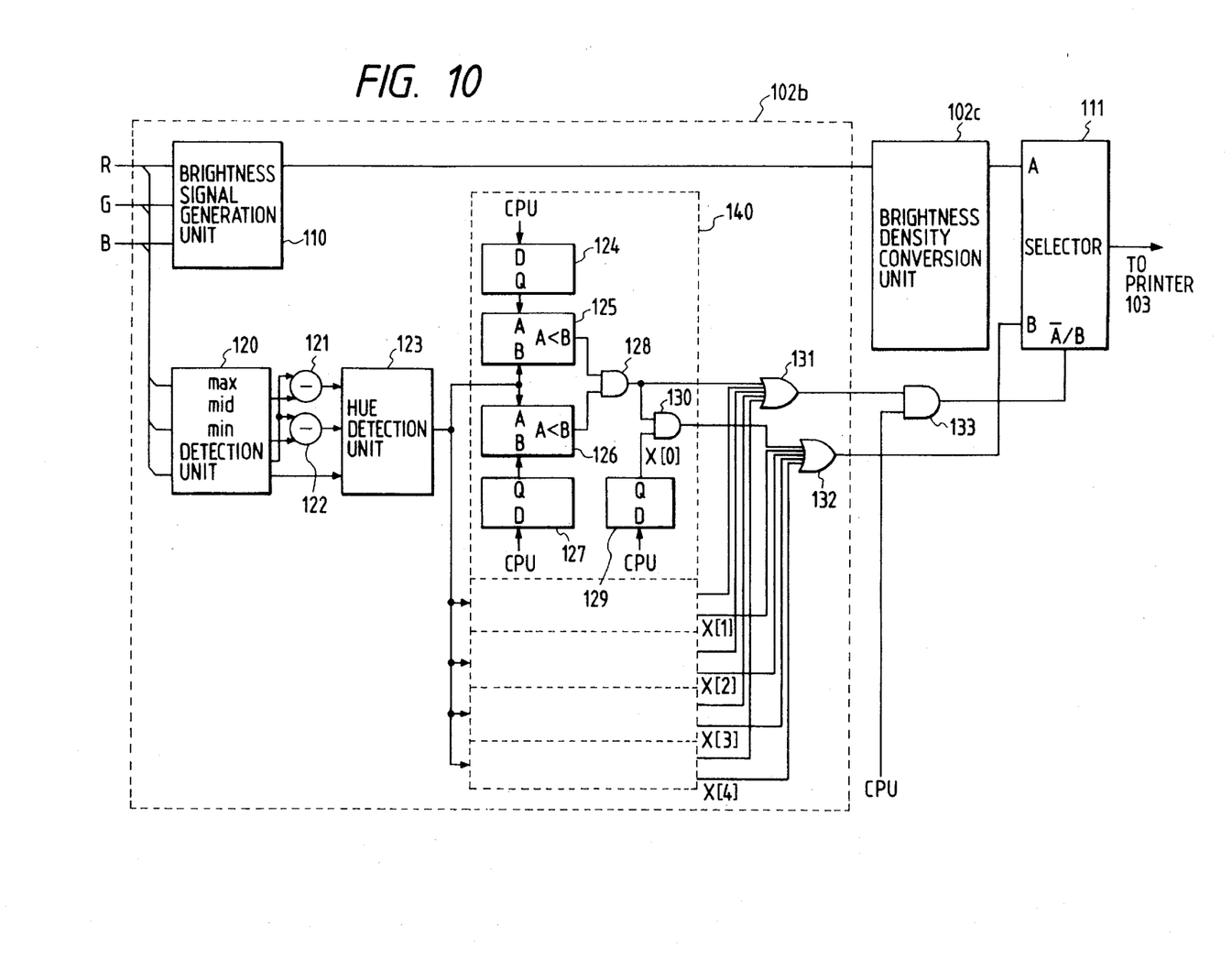
FIG. 10 is a block diagram of a data processing unit 102b and a brightness-density conversion unit 102c.

FIG. 10 shows another configuration of the data processing unit 102b and the brightness-density conversion unit 102c.

The circuit shown in FIG. 10 is same as that shown in FIG. 4, except for the values set in the register 129 and the position of the selector 111. The signal from the brightness signal generation unit 110 is directly supplied to the brightness-density conversion unit 102c. The signal from the conversion unit 102c and the data from the register 129 are supplied to the selector 111, and the selection is made according to the discrimination signals from the comparators 125, 126. In the registers 129, there are set, by the CPU 104, the output density data X[0]–X[4] corresponding to the predetermined colors, and, when the color of the input image is a predetermined color, the output density data set in the register 129 is supplied to the printer 103, in the area of the color. In this configuration, it is not necessary to consider the look-up table to be employed in the brightness-density conversion unit 102c.

It is also possible to apply such configuration to a circuit for converting a color in the input image into a pattern image. For example, the register 129 in FIG. 10 may be replaced by a memory in which a pattern image is stored in the form of an output density data, whereby a predetermined pattern is supplied to the printer 103 without relying on the brightness-density conversion unit 102c, in an area corresponding to a predetermined color.

Furthermore, these embodiments are applicable, in addition to an image reading apparatus, to the image entry from a computer, a filing apparatus or a facsimile apparatus, or, in addition to a printer, to the image output to a computer, a filing apparatus or a facsimile apparatus.

What is claimed is:

1. An image processing apparatus comprising:

discrimination means for discriminating a predetermined color in an input image;

first image processing means for performing first image processing on a first area of the input image according to a result of discrimination by said discrimination means;

setting means for setting a density of an output image relative to a density of the input image; and second image processing means for performing second image processing on a second area of the input image in accordance with the density set by said setting means, the second image processing performed by said second image processing means comprising density conversion in accordance with the density set by said setting means, whereby a density of the second area of the input image is converted to a density of a corresponding area of the output image:

wherein the first area is different from the second area.

2. An apparatus according to claim 1, wherein said discrimination means discriminates a color hue in the input image, and wherein said first image processing means performs the first image processing on a first area having the color hue discriminated by said discrimination means.

3. An apparatus according to claim 2, wherein said first image processing means generates an image having a density, in an area corresponding to the first area, which corresponds to the color hue in the first area of the input image.

4. An apparatus according to claim 1 further comprising control means which controls said second image processing means to perform the second image processing outside of the first area of the input image in which the first image processing is performed by said first image processing means.

5. An apparatus according to claim 1, wherein said discrimination means discriminates color value in the input image and determines whether the predetermined color is between a first color value and a second color value.

6. An apparatus according to claim 1, further comprising a reader for reading an original image; and a printer for printing an image output from said first image processing means and said second image processing means.

7. An apparatus according to claim 1, wherein said second image processing means performs one of darkening and lightening of the input image.

8. An apparatus according to claim 1, wherein said first image processing means converts the predetermined color into a predetermined monochrome density based on the result of discrimination of said discrimination means.

9. An apparatus according to claim 1, wherein said first image processing means converts the predetermined color into a predetermined monochrome pattern based on the result of discrimination of said discrimination means.

10. An image processing method comprising:

a discrimination step for discriminating a predetermined color in an input image;

a first image processing step for performing first image processing on a first area of the input image according to a result of discrimination from said discrimination step;

a setting step for setting a density of an output image relative to a density of the input image; and a second image processing step for performing second image processing on a second area of the input image in accordance with the density set in said setting step, the second image processing comprising density conversion in accordance with the density set by said setting means, whereby the density of the second area of the input image is converted to the density of a corresponding area of the output image;

wherein the first area is different from the second area.

11. A method according to claim 10, wherein said discrimination step discriminates a color hue in the input image, and wherein said first image processing step performs the first image processing on a first area having the color hue discriminated by said discrimination means.

12. A method according to claim 11, wherein said first image processing step generates an image having a density, in an area corresponding to the first area, which corresponds to the color hue in the first area of the input image.

13. A method according to claim 10, further comprising a controlling step for controlling said second image processing means to perform the second image processing outside of the first area of the input image in which the first image processing is performed.

14. A method according to claim 10, wherein said discrimination step discriminates a color value in the input image and determines whether the predetermined color is between a first color value and a second color value.

15. A method according to claim 10, further comprising:

a reading step for reading an original image; and a printing step for printing an image output from said first image processing step and said second image processing step.

16. A method according to claim 10, wherein said second image processing step performs one of darkening and lightening of the input image.

17. A method according to claim 10, wherein said first image processing step converts the predetermined color into a predetermined monochrome density based on the result of discrimination of said discrimination step.

18. A method according to claim 10, wherein said first image processing step converts the predetermined color into a predetermined monochrome pattern based on the result of discrimination of said discrimination step.

* * * * *

UNITED STATES PATENT AND TRADEMARK OFFICE
CERTIFICATE OF CORRECTION

PATENT NO. : 5,513,007
DATED : April 30, 1996
INVENTOR(S) : Akio Ito, et al.

It is certified that error appears in the above-identified patent and that said Letters Patent is hereby corrected as shown below:

On the title page, item:

[75] Inventors: "Satoru Kutsuwade" should read

--Satoru Kutsuwada--.

COLUMN 4:

Line 14, "discirmination" should read --discrimination--;
Line 16, "luminocity" should read --luminosity--;
Line 20, "outlines" should read --outlines of--;
Line 34, "luminocity" should read --luminosity--; and
Line 41, "are" should read --is--.

COLUMN 8:

Line 1, "claim 1" should read --claim 1,--.

Signed and Sealed this

Thirty-first Day of December, 1996

Attest:

BRUCE LEHMAN

Attesting Officer        Commissioner of Patents and Trademarks